United States Patent
Harpole

(10) Patent No.: US 7,584,628 B2
(45) Date of Patent: Sep. 8, 2009

(54) SYSTEM FOR DELIVERING COOLANT TO A LASER SYSTEM

(75) Inventor: George Manchester Harpole, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 455 days.

(21) Appl. No.: 11/477,974

(22) Filed: Jun. 29, 2006

(65) Prior Publication Data
US 2008/0000613 A1    Jan. 3, 2008

(51) Int. Cl.
*F25D 17/02* (2006.01)
(52) U.S. Cl. .................................................. 62/434
(58) Field of Classification Search .................. 62/434; 165/10, 80.4
See application file for complete search history.

(56) References Cited

U.S. PATENT DOCUMENTS 5,465,585 A    11/1995   Mornhed et al.
6,826,222 B2 *  11/2004   Hill ............................... 372/89
6,890,346 B2 *   5/2005   Ganz et al. ..................... 607/88

OTHER PUBLICATIONS

1999 Ashrae Handbook, "Heating, Ventilating, and Air-Conditioning Applications"; Inch-Pound Edition, American Society of Heating, Refrigerating and Air-Conditioning Engineers, Inc., pp. 33.1-33.16.

* cited by examiner

*Primary Examiner*—Melvin Jones
(74) *Attorney, Agent, or Firm*—Tarolli, Sundheim, Covell & Tummino LLP

(57) ABSTRACT

A cooling system is provided for providing a coolant to a laser system at a substantially set temperature. The cooling system employs a stratified thermal energy storage (TES) device that is configured to distribute hot coolant provided at an inlet port over a cross-sectional area of the TES device to provide a substantially uniform, stratified flow of a hot coolant that flushes a cold coolant from the TES device at an outlet port. The distributed inflow of the hot coolant provides a uniform downward velocity flow of the hot coolant and the cold coolant and takes advantage of an unmixed condition of the hot coolant and the cold coolant.

20 Claims, 4 Drawing Sheets

SYSTEM FOR DELIVERING COOLANT TO A LASER SYSTEM

TECHNICAL FIELD

The present invention relates generally to coolant systems, and more particularly to a system for delivering coolant to a laser system.

BACKGROUND

Diode pumped solid state lasers are typically cooled by a flow of water or ethylene glycol water (EGW) mixture. This coolant must be delivered at a precise temperature so that the diode light will remain within a particular, narrow wavelength range. In many cases, the operation of the laser consists of short lasing durations with an order of magnitude of longer off times (e.g., on for 1 minute and off for 9 minutes). Therefore, a thermal energy storage (TES) device may be desirable to enable the use of smaller refrigeration systems or other heat rejection systems. The TES device could either employ a phase change material (PCM) or it could be just a tank of coolant, as a thermal mass. If the initial chill temperature of the coolant is as much as 15° C. to 20° C. colder than the laser inlet or exit temperature, then a water tank as a TES device becomes a particular attractive option from a weight basis. Other high power applications require similar coolant systems.

A typical cooling system would include a coolant delivery loop for delivering coolant during lasing durations, and a rechill loop for rechilling the coolant heated by the laser during the lasing duration. The cooling system can include a TES device that is coupled to both the laser flow loop and the rechill loop. The TES device in the coolant delivery loop can be plumbed with a bypass to a thermal control valve (TCV) that mixes hot coolant from the laser with cold coolant from the TES device to achieve a controlled, set temperature desired for the laser inlet flow. A portion of the hot coolant is also delivered to the TES device to push out the cold coolant to mix with the hot coolant. In the usual thermal analysis of the tank, the hot and cold coolant in the tank is assumed to be well mixed. However, in most tank configurations the hot coolant is injected into the tank through an inlet flow jet that bypasses a large portion of the cold coolant resulting in poor mixing of hot and cold coolant and inefficient use of the cold coolant.

SUMMARY

In one aspect of the invention, a coolant system is provided for delivering coolant to a laser system. The coolant system can comprise a pump that pumps coolant to the laser system, and a stratified thermal energy storage (TES) device having an inlet port and an outlet port. The stratified TES device can be configured to distribute inlet coolant provided at an inlet port over a cross-sectional area of the stratified TES device to provide a substantially uniform, stratified flow of an inlet coolant that flushes an existing coolant from the TES device at an outlet port to the laser system and mitigates mixing of the inlet coolant with the existing coolant.

In another aspect of the invention, a system is provided having a coolant delivery loop for delivering coolant to a laser system. The system may comprise a pump that pumps coolant through the coolant delivery loop and a stratified TES device. The TES device may comprise a first header coupled to an inlet port, a second header coupled to an outlet port and a generally cylindrical body portion that extends from the first header to the second header. The TES device may further comprise an inlet perforated plate that extends over the diameter of the cylindrical body portion near the first header to facilitate the distribution of inlet coolant over the cross-sectional area of the body portion to provide a substantially uniform, stratified flow of an inlet coolant that flushes an existing coolant from the TES device at an outlet port to the laser system and mitigates mixing of the inlet coolant with the existing coolant.

In yet another aspect of the invention, a system is provided for delivering coolant to a laser system. The system may comprise means for pumping coolant to the laser system and means for storing a cold coolant having a temperature $T_C$. The means for storing a cold coolant may comprise means for distributing hot coolant, having a temperature $T_H$ which is greater than $T_C$, received at an inlet port over a cross-sectional area of the means for storing to provide a substantially uniform, stratified flow of the hot coolant that flushes the cold coolant at an outlet port to the laser system and mitigates mixing of the hot coolant with the cold coolant. The coolant system may further comprise means for controlling fractional portions of the cold coolant flushed from the means for storing and a hot coolant that flows through a bypass path to provide a desired mixing ratio of the hot coolant and cold coolant that flows through the means for controlling and provide a coolant at a set temperature $T_{SET}$ to the laser system.

DETAILED DESCRIPTION

The present invention relates to a cooling system for providing a coolant to laser system at a substantially set temperature. The cooling system employs a stratified thermal energy storage (TES) device that is configured to distribute hot coolant provided at an inlet port over a cross-sectional area of the TES device to provide a uniform, stratified flow of hot coolant that flushes cold coolant from the TES device at an outlet port. The distributed inflow of hot coolant provides a uniform downward velocity flow of hot coolant and cold coolant and takes advantage of an unmixed condition of the hot coolant and cold coolant. In one aspect of the invention, the TES device is a water (or coolant) tank that includes an inlet perforated plate that distributes the hot coolant over the cross-sectional area of the tank. The TES device can also include an outlet perforated plate that receives and redirects the cold coolant to the outlet port. A variety of additional embodiments are provided that facilitate the distribution of the inflow of inlet coolant over the cross-sectional area of the TES device.

A hot coolant as used herein is defined as a coolant that has a temperature $T_H$ and a cold coolant is defined as a coolant that has a temperature $T_C<T_H$. A set temperature $T_{SET}$ is defined herein as a temperature of a coolant that is provided to a laser system based on fractional portions of cold coolant hot coolant, such that $T_C<T_{SET}<T_H$.

Figure 1:
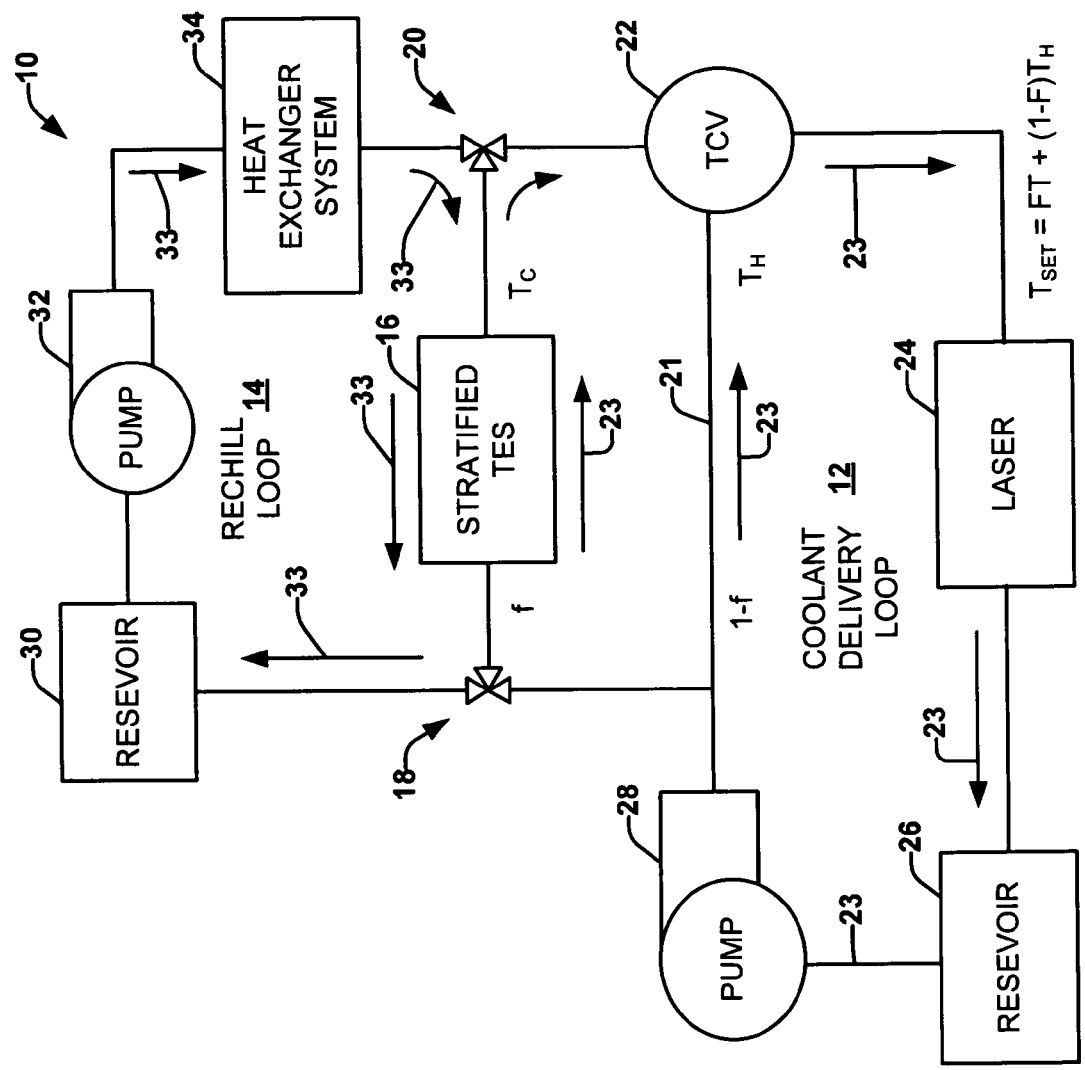
FIG. 1 illustrates block schematic diagram of a cooling system for providing a coolant to a laser system in accordance with an aspect of the present invention.

FIG. 1 illustrates a cooling system 10 for providing a coolant to a laser system 24 in accordance with an aspect of the present invention. Although the present example is illustrated with respect to providing a coolant to a laser system, the coolant system can be employed for cooling other laser systems that require a coolant that is to be provided at a set temperature. The coolant system includes a coolant delivery loop 12 that provides coolant to at least a portion of the laser system 24 at a desired set temperature $T_{SET}$ during a lasing time period, and a rechill loop 14 that cools hot coolant from a hot coolant temperature $T_H$ to a cold coolant temperature $T_C$ during a lasing off time period. The coolant can be in the form of water, an ethylene glycol/water (EGW) solution or some other form of coolant. A stratified TES device 16 is employed to provide cold coolant to be mixed with hot coolant from the laser system 24 to provide the desired set temperature. The stratified TES device 16 alternates between providing cold coolant through the coolant delivery loop 12 along arrows 23 during lasing time periods and hot coolant to the rechill loop 14 during the laser off time periods along arrows 33 via a pair of three way valves 18 and 22.

The coolant delivery loop 12 includes a thermal control valve (TCV) 22 that receives cold coolant from the stratified TES device 16 and hot coolant through a bypass path 21. The hot coolant is heated by the laser system 24 during the lasing time period and flows to a reservoir 26. A pump 28 removes the hot coolant from the reservoir 26 and provides a portion of the hot coolant through the bypass path 21 and a fractional portion of the hot coolant to the stratified TES device 16 for flushing the cold coolant from the stratified TES device 16. The fraction of the total flow through the stratified TES device 16 is f, while the rest of the flow, 1–f, bypasses directly through the bypass path 21 to the TCV 22. The TCV 22 receives and mixes the hot and cold coolant to achieve the controlled, set temperature desired for the laser inlet flow based on the equation $T_{SET}=fT_C+(1-f)T_H$, where $T_C$ is the temperature of the cold coolant exiting the TES device 16 and $T_H$ is the temperature of the hot coolant exiting the pump 28. For example, in one embodiment a required laser inlet temperature is $T_{set}=25°$ C., and the laser plus pump work heating adds 3° C., so that $T_H=28°$ C. then the cold coolant can be set at $T_C=5°$ C. with the TCV 22 set to mix the hot and cold coolant in a proportion to provide $T_{set}=25°$ C.

It is to be appreciated that the stratified TES device 16, the bypass path 21, and the TCV 22 can alternatively be placed downstream of the laser system 24 and upstream of the pump 28. An advantage of the placement as shown in FIG. 1 is better control of the laser inlet temperature. An advantage of the alternative placement is lower pressure in the TES device 16. It is to be appreciated that the example of the cooling system 10 of FIG. 1 can include other components, such as filters, a reservoir or accumulator upstream of the pump 28, and various other components.

Upon completion of the lasing time period, the temperature of the coolant in the stratified TES device 16 is substantially equal to the hot coolant temperature $T_H$. The coolant in the stratified TES device 16 is then directed through the rechill loop 14 during the laser off time as illustrated by arrows 33. The rechill loop 14 includes the stratified TES device 16, a reservoir 30, a pump 32 and a heat exchanger system 34. The coolant in the stratified TES device 16 is delivered to the reservoir 30 and provided to the heat exchanger system 34 for cooling via the pump 32. The heat exchanger system 34 can be a refrigeration system or some other cooling system. The coolant may be pumped through the rechill loop 14 several times to achieve the desired cold coolant temperature $T_C$. Alternatively, in some applications it is possible to use the pump 28 and coolant lines in the coolant delivery loop 12 for chilling too, but include the heat exchanger system 34 upstream of the stratified TES device 16. These two choices are transparent to the stratified TES device 16. A third choice would be to incorporate the heat exchanger system 34 within the stratified TES device 16 itself.

The stratified TES device 16 is configured to distribute hot coolant provided at an inlet port over a cross-sectional area of the TES device 16 to provide a uniform, stratified flow of hot coolant that flushes cold coolant from the TES device at an outlet port. In accordance with an aspect of the present invention, the TES device 16 can be in the form of a water (or coolant) tank that takes advantage of an unmixed condition, like pipelined flow. The water tank can be thermally stratified, with hot (less dense) coolant entering at the top, and cold (more dense) coolant exiting at the bottom. An inlet flow jet associated with conventional water tanks (e.g., a well-mixed tank) would largely defeat this stratification in most common tank configurations. However, the stratified TES device 16 promotes a uniform, downward velocity flow of coolant, such that a sharp, moving, horizontal plane is formed across the cross-sectional area of the stratified TES device 16 with coolant below the plane having the initial chill temperature, $T_C=T_0$, and the coolant above the plane having the hot inlet temperature, $T_H$. The stratified TES device 16 can be, for example, a water tank sized so that it exchanges cold coolant for hot coolant through its whole volume just once during a worst case, single lasing period. Therefore, it starts at temperature $T_C=T_0$, and ends at temperature $T_H$.

The following is an analysis that illustrates the advantages of a stratified tank versus a conventional well-mixed tank. It is to be appreciated that the mass of water or other coolant required for the TES purpose is proportional to the time integrated heat load, or cumulative thermal energy dissipated, E, during a lasing period. A well-mixed tank can be used until the tank temperature reaches the laser inlet temperature set point, $T_{set}$. Conversely, a stratified tank can be used until fluid in the whole tank is at the exit temperature from the laser and pump, $T_H$. Thus, the mass of coolant required for a well-mixed tank is $$M_{WMT} = \frac{E}{C_P(T_{SET} - T_0)} \qquad \text{EQ. 1}$$

where $C_P$ is the specific heat of the coolant (for water, 4184 J/kg-K or 1.0 Btu/lb °F.), while the mass of coolant required for a stratified tank is:

$$M_{ST} = \frac{E}{C_P(T_H - T_0)} \qquad \text{EQ. 2}$$

The mass ratio of a well mixed to a stratified tank for the same cumulative energy is then $M_{WMT}/M_{ST}=(T_H-T_0)/(T_{set}-T_0)$. Considering the previously stated first example, where the initial chill is to $T_0=5°$ C., and the laser inlet temperature is $T_{set}=25°$ C., and the laser plus pump work heating adds 3° C., so that $T_H=28°$ C. Then the mass advantage is $(28-5)/(25-5)=1.15\times$ or 15%. Considering a second example where the initial chill can be only $T_0=15°$ C., and the laser inlet temperature is $T_{set}=20°$ C., and again the laser plus pump work heating adds 3° C., so that $T_H=23°$ C. Then the mass advantage with the stratified tank is $(23-15)/(20-15)=1.6\times$ or 60% as compared to the well-mixed tank.

It is further appreciated that the mixture temperature, $T_{set}$, is related to the temperatures and flow rate fractions of the mixing streams illustrated in FIG. 1 as follows:

$$T_{SET} = fT_C + (1-f)T_H \quad \text{EQ. 3}$$

The temperature rise from the laser inlet due to heat, Q, from the laser plus flow work plus pump inefficiencies can be expressed as $$T_H = T_{SET} + \frac{Q}{\rho C_p \dot{V}} \quad \text{EQ. 4}$$

where $\rho$ is the fluid density and $\dot{V}$ is the total volume flow rate. EQ. 3 can be rewritten as an expression for the flow rate fraction through the TES as:

$$f = \frac{T_H - T_{SET}}{T_H - T_C} \quad \text{EQ. 5}$$

It is to be appreciated that $T_C=T_0$ is constant for the stratified tank, so that flow (f) is constant for the stratified tank when the heat load is constant. Conversely, $T_C$ ramps up from $T_0$ to $T_{set}$ during a lasing period with a conventionally well-mixed tank. Therefore, with a well-mixed tank the flow rate varies significantly, ending with 100% of the flow rate traveling through the stratified tank at the end of the lasing period. The constant flow rate is a significant advantage for the stratified tank.

For example for a stratified tank, the flow rate fraction through the tank is f=0.13 for the first previously stated example, and f=0.375 for the second previously stated example. The flow rate fractions with the well-mixed tank would start at these values, but would rise to f=1 at the end, as $T_C$ rises to $T_{set}$. Thus, the maximum flow rate through the TES is 8× or 3× lower with a stratified tank as compared to a well-mixed tank. Therefore, the plumbing lines, fittings, and any valves connected to the stratified tank can be smaller with a stratified tank than would be necessary with a well-mixed tank.

In summary, some of the advantages of the stratified tank versus the well-mixed tank for the previously stated analysis are a smaller mass by a factor which may range from about 1.15× to 1.6×, a constant flow rate through the stratified tank when the heat load is constant, which improves controllability and reduces pressure variations, and a lower maximum flow rate through the stratified water tank and associated lines by a factor which may range from about 3× to 8×, which allows smaller plumbing lines and associated components in the region connected to the stratified tank.

It is to be appreciated that during the rechill period, the stratified TES device 16 is configured to distribute cold coolant provided at the outlet port over a cross-sectional area of the TES device 16 to provide a uniform, stratified flow of cold coolant that flushes hold coolant from the TES device 16 at the inlet port through the rechill loop 14 in a similar manner as the cold coolant is flushed from the TES device 16 by the hot coolant during a lasing period.

Figure 2:
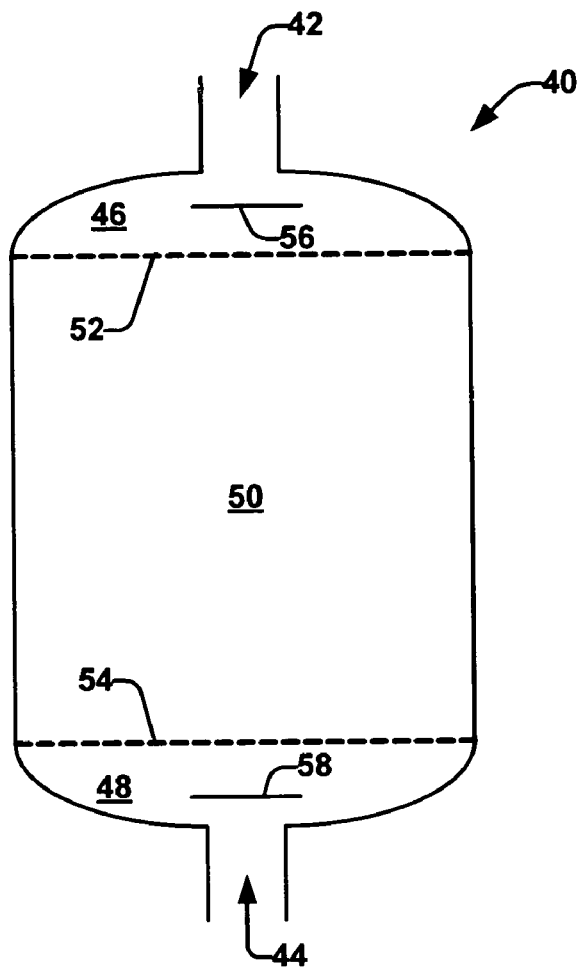
FIG. 2 illustrates a side view of a stratified TES device in accordance with an aspect of the present invention.

FIG. 2 illustrates a stratified TES device 40 in accordance with an aspect of the present invention. The stratified TES device 40 can be, for example, a water (or coolant) tank. The stratified TES device 40 includes an inlet port 42 for receiving coolant and an outlet port 44 for providing coolant. The TES device 40 further includes a first header 46 coupled to the inlet port 42, a second header 48 coupled to the outlet port 44 and a cylindrical body portion 50 that extends from the first header 46 to the second header 48. The cylindrical body portion 50 has a generally constant diameter and defines the largest cross-sectional area of the TES device 40 across its horizontal plane. The first header 46 is defined as the volume of expansion from the inlet port 42 to a first end of the generally constant diameter of the cylindrical body portion 50. The second header 44 is defined as the volume of expansion from the outlet port 44 to a second end of the generally constant diameter of the cylindrical body portion 50.

A first perforated plate 52 spans the diameter of the TES device 40 at or near the first end of the cylindrical body portion 50 and a second perforated plate 54 spans the diameter of the TES device 40 at or near the second end of the cylindrical body portion 50. The first perforated plate 52 facilitates the distribution of coolant over the cross-sectional area of the cylindrical body portion 50 to provide a uniform, stratified flow of new coolant over the cross-sectional area of the TES device 40. The second perforated plate 54 works in conjunction with the first perforated plate 52 to receive and flush the existing coolant from the TES device 40 at the outlet port 44.

Figure 3:
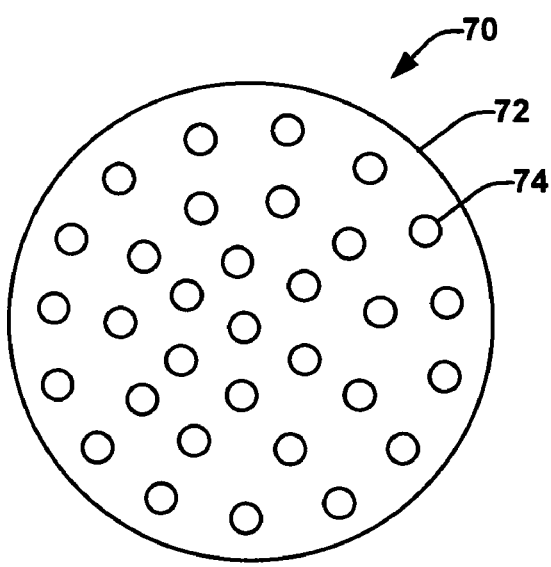
FIG. 3 illustrates a plan view of a perforated plate in accordance with an aspect of the present invention.

FIG. 3 illustrates a plan view of a perforated plate 70 in accordance with an aspect of the present invention. The perforated plate 70 can be employed as the first and/or second perforated plate of FIG. 2. The perforated plate 70 includes a plurality of openings 74 (or perforations) substantially symmetrically distributed over a generally disk shaped body portion 72. Although the plurality of openings 74 are illustrated as generally circular, the openings can be in the form of a variety of other shapes and sizes, such that a variety of other configurations of porous type plates or screens can be employed. It is to be appreciated that the size, shape and distributions of the openings 74 in FIG. 3 are for illustrated purposes only and the actual size of the openings would likely be much smaller. For example, in one embodiment the holes would have a diameter of about 1/16" over a 2' diameter body portion.

Figure 4:
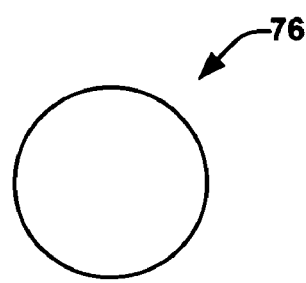
FIG. 4 illustrates a plan view of a baffle in accordance with an aspect of the present invention.

Returning to the discussion of FIG. 2, optionally, a first baffle 56 is located in the first header 46 horizontally, centered and spaced apart a predetermined distance from an opening of the inlet port 42 to the first header 46, and a second baffle 58 is located in the second header 48 horizontally, centered and spaced apart a predetermined distance from an opening of the outlet port 44 to the second header 48. The first baffle 56 facilitates the distribution of flow of the inlet coolant in a manner to sweep out the existing coolant from the first header 48 and to mitigate the mixing of new coolant and the existing coolant in the first header 48. The second baffle 58 facilitates the distribution of flow of the outlet coolant in a manner to sweep out the existing coolant from the second header 48 and to mitigate the mixing of new coolant and the existing coolant in the second header 48. FIG. 4 illustrates a plan view of a baffle 76 in accordance with an aspect of the present invention. The baffle 76 can be employed as the first and/or second baffle illustrated in FIG. 2. The baffle 76 is generally disk-shaped, and mounted along a horizontal plane of the TES device. However, a variety of other different types of baffle configurations could be employed, such as a cone shaped baffle having a vertex near the inlet, or some other shaped configuration to distribute flow in a manner to flush out a header of the TES device.

Figure 5:
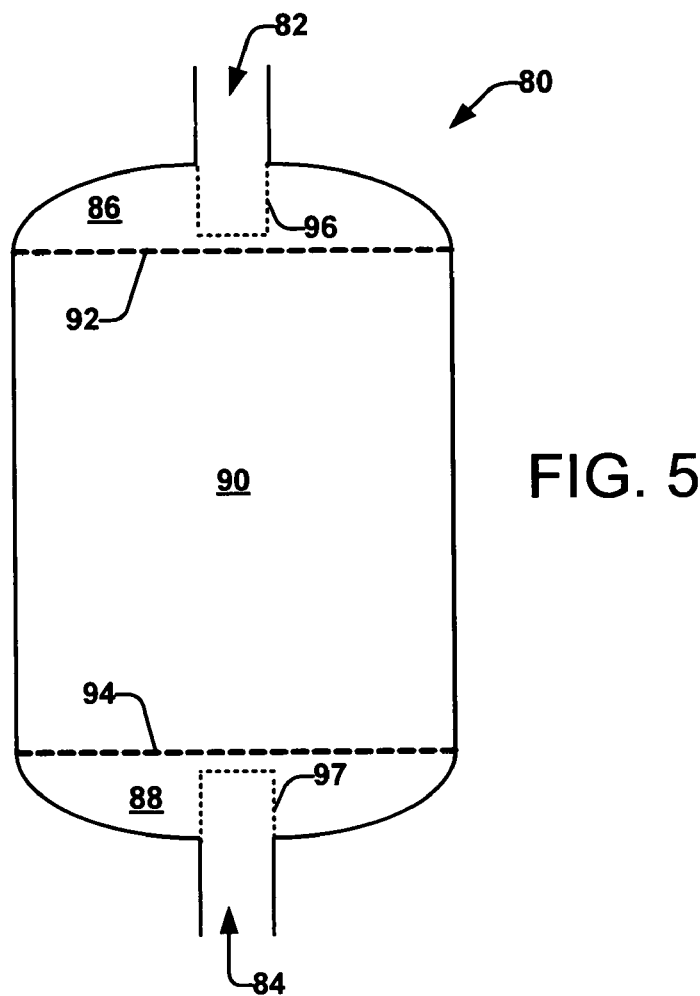
FIG. 5 illustrates a side view of another stratified TES device in accordance with an aspect of the present invention.

FIG. 5 illustrates a stratified TES device 80 in accordance with another aspect of the present invention. The stratified TES device 80 can be, for example, a water (or coolant) tank. The stratified TES device 80 includes an inlet port 82 for receiving coolant and an outlet port 84 for providing coolant. The TES device 80 further includes a first header 86 coupled to the inlet port, a second header 88 coupled to the outlet port 84 and a cylindrical body portion 90 that extends from the first header 86 to the second header 88. The cylindrical body portion 90 has a generally constant diameter and defines the largest cross-sectional area of the TES device 80 across its horizontal plane.

A first perforated plate 92 spans the diameter of the TES device 80 at or near a first end of the cylindrical body portion 90 and a second perforated plate 94 spans the diameter of the TES device 80 at or near the second end of the cylindrical body portion 90. The first perforated plate 92 facilitates the distribution of coolant over the cross-sectional area of the cylindrical body portion 90 to provide a uniform, stratified flow of new coolant over the cross-sectional area of the TES device 80. The second perforated plate 94 works in conjunction with the first perforated plate 92 to receive and flush the existing coolant from the TES device 80 at the outlet port 84.

Figure 6:
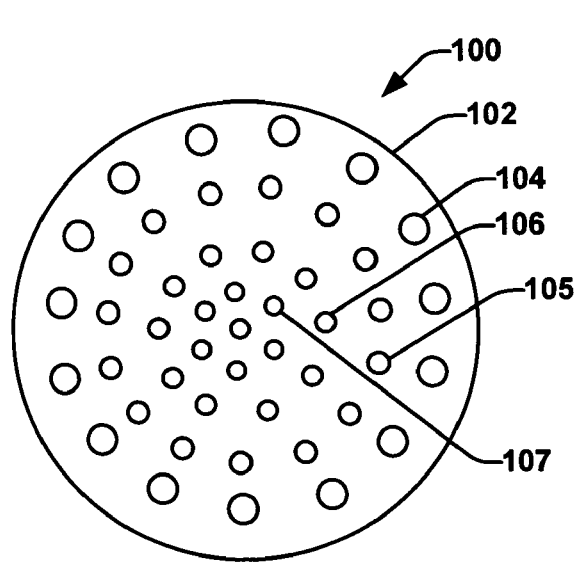
FIG. 6 illustrates a plan view of another perforated plate in accordance with an aspect of the present invention.

FIG. 6 illustrates a plan view of a perforated plate 100 in accordance with another aspect of the present invention. The perforated plate 100 can be employed as the first and/or second perforated plate of FIG. 5. The perforated plate 100 includes a plurality of openings (or perforations) 104-107 substantially symmetrically distributed over a generally disk shaped body portion 102. The plurality of openings 104-107 extend from the outer periphery of the perforated plate 100 to the center of the perforated plate 100 in which the openings get smaller as they go from the outer periphery to the center of the plate 100. This plate configuration directs portions of coolant flow received at the center of the plate via an inlet port directed at the center of the plate to the outside of the plate to facilitate the distribution of coolant over the cross-sectional area of a TES device. It is to be appreciated that the size, shape and distributions of the openings 105-107 in FIG. 6 are for illustrated purposes only and the actual size of the openings would likely be much smaller.

Referring again to the discussion of FIG. 5, alternatively or in addition to the first and second perforated plates 92 and 94, a first perforated or porous cylinder 96 can extend from the inlet port 82 into the first header 86 and be configured to distribute the flow from the inlet port 82 in a manner that sweeps out the first header 86 and mitigates the mixing of new coolant and the existing coolant in the first header 86. Additionally, a second perforated or porous cylinder 97 can extend from the outlet port 82 into the second header 88 and be configured to distribute the flow into the outlet port 82 in a manner that sweeps out the second header 88 and mitigates the mixing of new coolant and the existing coolant in the second header 88.

Figure 7:
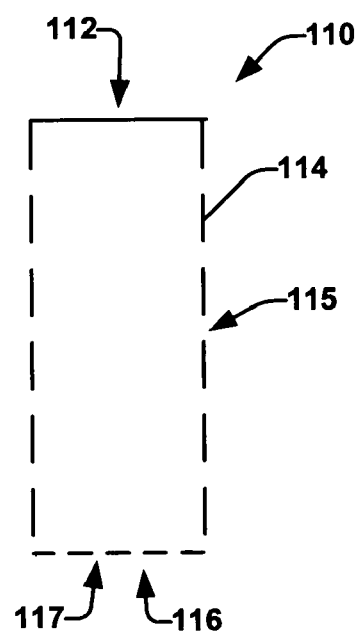
FIG. 7 illustrates a side view of a porous cylinder in accordance with an aspect of the present invention.

FIG. 7 illustrates a perforated cylinder 110 that can be employed as the perforated or porous cylinder of FIG. 5. The perforated cylinder 110 that has an inlet end 112 and an outlet end 116 and an outer cylindrical body 114 that extends from the inlet end 110 to the outlet end 116. The outer cylindrical body 114 has a plurality of first openings 115 of a first size that extend around the periphery of the outer cylindrical body 114. The inlet end 112 includes an opening for receiving coolant from the inlet port of a TES device, while the outlet end 116 has a plurality of second openings 117 of a second size. The plurality of first openings 115 are sized to be larger than the plurality of second openings 117 to facilitate the distribution of flow of the inlet coolant in a manner to sweep out the existing coolant from the first header 86 and to mitigate the mixing of new coolant and the existing coolant in the first header 86. It is to be appreciated that the perforated cylinder 110 can be replaced with a variety of different shaped configurations as long as the functionality of distributing the flow across the cross-sectional area of the TES device 80 and/or the sweeping of the coolant from the first header 86 is obtained.

Figure 8:
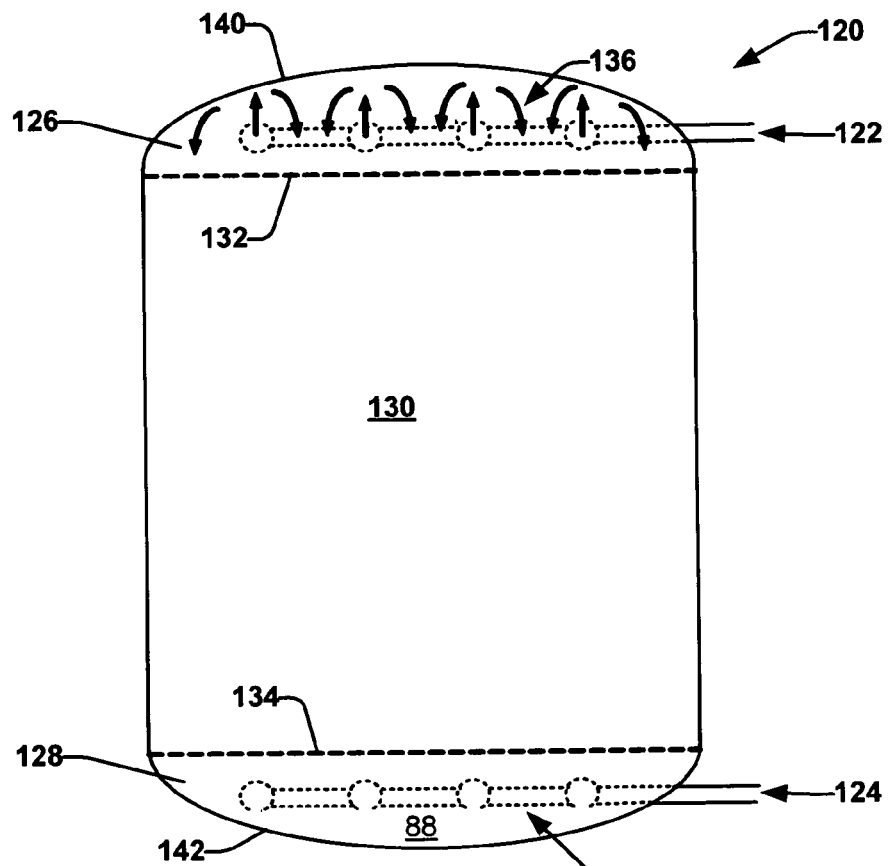
FIG. 8 illustrates a side view of yet another stratified TES device in accordance with an aspect of the present invention.

FIG. 8 illustrates a stratified TES device 120 in accordance with yet another aspect of the present invention. The stratified TES device 120 can be, for example, a water (or coolant) tank. The stratified TES device 120 includes an inlet port 122 for receiving coolant and an outlet port 124 for providing coolant. The TES device 120 further includes a first header 126 coupled to the inlet port 122, a second header 128 coupled to the outlet port 124 and a cylindrical body portion 130 that extends from the first header 126 to the second header 128. The cylindrical body portion 130 has a generally constant diameter and defines the largest cross-sectional area of the TES device 120 across its horizontal plane.

A first perforated plate 132 spans the diameter of the TES device 120 at or near the first end of the cylindrical body portion 130 and a second perforated plate 134 spans the diameter of the TES device 120 at or near the second end of the cylindrical body portion 130. The first perforated plate 132 facilitates the distribution of coolant over the cross-sectional area of the cylindrical body portion 130 to provide a uniform, stratified flow of new coolant over the cross-sectional area of the TES device 120. The second perforated plate 134 works in conjunction with the first perforated plate 132 to receive and flush the existing coolant from the TES device 120 at the outlet port 124, as discussed previously with respect to FIGS. 1-7.

Alternatively or in addition to the first and second perforated plates 132 and 134, a first manifold 136 can extend from the inlet port 122 into the first header 136 and be configured to distribute the flow from the inlet port 122 in a manner that sweeps out the first header 126 and mitigates the mixing of new coolant and the existing coolant in the first header 126. The first manifold 136 includes a network of tubes positioned within a small distance of a first endwall or ceiling 140 of the TES device 120 disposed near the inlet port 122, and are perforated or slotted to direct the inlet coolant to the first endwall or ceiling 140 of the TES device 120 both to flush the volume of coolant and to spread the flow uniformly by the time it reverses for downward flow through the TES device 120. A second manifold 138 similar to the first manifold 136 can be included at a second endwall or floor 142 of the TES device 120 disposed near the outlet port 124 to facilitate stratification of the existing or outlet coolant.

Figures 9, 10:
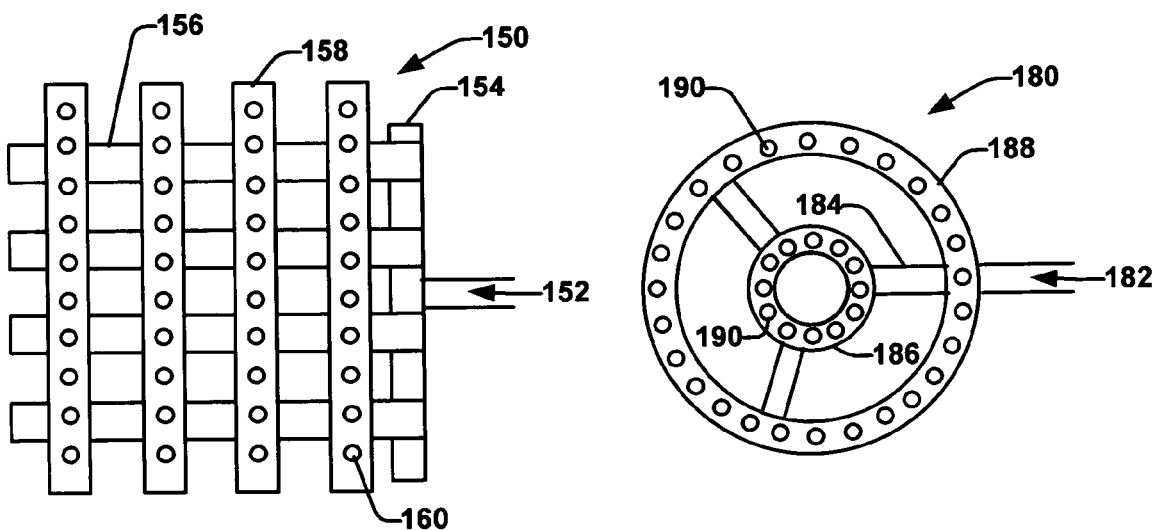
FIG. 9 illustrates a plan view of a manifold in accordance with an aspect of the present invention.
FIG. 10 illustrates a plan view of another manifold in accordance with an aspect of the present invention.

FIGS. 9-10 illustrate exemplary manifolds that can be employed t sweep out header portions of a TES device in accordance with aspect of the present invention. It is to be appreciated that the manifolds illustrated in FIGS. 9-10 are simply examples of manifolds that could be employed to sweep out header portions of a TES device, and that a variety of shapes and configurations can be employed to carry out the functionality described herein.

FIG. 9 illustrates a manifold 150 in accordance with an aspect of the present invention. The manifold 150 can be employed as either the first or second manifold of FIG. 8. The manifold 150 includes an inlet port 152 that can form an inlet port of a TES device. The inlet port 152 is coupled to an input bar 154 that distributed coolant to a plurality of support bars 156. The plurality of support bars 156 are coupled to a first side of a plurality of distribution bars 158 having a plurality of openings or perforations 160 on a second side for distributing coolant provided to the input port 152. The plurality of support bars 156 are substantially transverse to the plurality of distribution bars 158. The plurality of support bars 156 can include opening or channels for communicatively coupling the inlet port 152 to the plurality of distribution bars and for providing coolant from the inlet port 152 and the input bar 152 to the plurality of distribution bars 158. The manifold 150 can be disposed in a TES device such that the plurality of distribution openings or perforations 160 face a first endwall or second endwall and the inlet port extends outside the TES device, as illustrated in FIG. 8. It is appreciated that the support bars 156 could also include distribution openings or perforations between the distribution bars 158.

FIG. 10 illustrates a manifold 180 in accordance with another aspect of the present invention. The manifold 180 includes an inlet port 182 that can form an inlet port of a TES device. The inlet port 182 is coupled to an input ring 184 through a support bar 184. The input ring 184 is coupled to an outer distribution ring 188 through three support bars 184. The outer distribution ring 188 and the input ring include a plurality of openings or perforations 190 for distributing coolant provided to the input port 182. The support bars 184 include opening or channels communicatively coupling the inlet port 182 to the outer distribution ring 186 and inner ring 186 and for providing coolant from the input ring 186 to the outer distribution ring 188 and inner ring 186. The manifold 180 can be disposed in a TES device such that the plurality of distribution openings or perforations 190 face a first endwall or second endwall and the inlet port 182 extending outside the TES device, as illustrated in FIG. 8. It is appreciated that the support bars 184 could also include distribution openings or perforations for distributing coolant.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for delivering coolant to a laser system, the system comprising:
   a pump that pumps coolant to the laser system; and
   a stratified thermal energy storage (TES) device having an inlet port and an outlet port, the stratified TES device being configured to distribute inlet coolant provided at an inlet port over a cross-sectional area of the stratified TES device to provide a substantially uniform, stratified flow of inlet coolant that flushes an existing coolant from the TES device at an outlet port to the laser system and mitigates mixing of the inlet coolant with the existing coolant.

2. The system of claim 1, further comprising:
   a bypass path configured in parallel with the stratified TES device; and
   a control valve that controls fractional portions of coolant that flow through the stratified TES device and the bypass path to provide a desired mixing ratio of the existing coolant and a bypass coolant to the laser system.

3. The system of claim 2, wherein the bypass coolant and the inlet coolant is a hot coolant that has a temperature $T_H$ and the existing coolant in the stratified TES device is a cold coolant having a temperature $T_C$, which is less than $T_H$, such that the control valve provides a coolant at a set temperature $T_{SET}$ to the laser system based on the fractional portions of the cold coolant from the stratified TES device and the hot coolant from the bypass path, the temperature $T_H$ being a result of heating of coolant at temperature $T_{SET}$ from at least one of the laser system and the pump.

4. The system of claim 3, further comprising a heat exchanger system for cooling the temperature $T_H$ of the hot coolant to the temperature $T_C$ of the cold coolant.

5. The system of claim 1, wherein the TES device is a coolant tank and further comprises:
   a first header coupled to the inlet port;
   a second header coupled to the outlet port;
   a body portion that extends from the first header to the second header; and
   an inlet perforated plate that extends over the cross-sectional area of the body portion near the first header to facilitate the distribution of the inlet coolant over the cross-sectional area of the body portion.

6. The system of claim 5, further comprising an outlet perforated plate that extends over the cross-sectional area of the body portion near the second header to flush the existing coolant from the TES device at the outlet port.

7. The system of claim 6, further comprising a first baffle located in the first header horizontally, centered and spaced apart a predetermined distance from an opening in the inlet port to the first header to facilitate the distribution of flow of the inlet coolant to sweep out the existing coolant from the first header.

8. The system of claim 7, further comprising a second baffle located in the second header horizontally, centered and spaced apart a predetermined distance from an opening in the outlet port to the second header to facilitate the distribution of flow of outlet coolant and to sweep out the existing coolant from the second header.

9. The system of claim 1, further comprising a first perforated cylinder that extends from an opening in the inlet port into the first header to facilitate the distribution of flow of the inlet coolant and to sweep out the existing coolant from the first header; and
   a second perforated cylinder that extends from an opening in the outlet port into the second header to facilitate the distribution of flow of outlet coolant and to sweep out the existing coolant from the second header.

10. The system of claim 1, further comprising a manifold coupled to one of the inlet port and the outlet port, the manifold having a plurality of openings spaced apart and pointing toward an endwall of the TES device disposed near the one of the inlet port and the outlet port to facilitate the distribution of flow of coolant and to sweep out the existing coolant from an associated header near the one of the inlet port and the outlet port.

11. The system of claim 10, wherein the manifold comprises a plurality of spaced apart distribution bars having a plurality of openings communicatively coupled to the one of the inlet port and the outlet port.

12. The system of claim 10, wherein the manifold comprises a distribution ring having a plurality of openings communicatively coupled to the one of the inlet port and the outlet port.

13. A system having a coolant delivery loop for delivering coolant to a laser system, the system comprising:
- a pump that pumps coolant through the coolant delivery loop;
- a stratified thermal energy storage (TES) device comprising:
    - a first header coupled to an inlet port;
    - a second header coupled to an outlet port;
    - a generally cylindrical body portion that extends from the first header to the second header; and
    - an inlet perforated plate that extends over the diameter of the cylindrical body portion near the first header to facilitate the distribution of an inlet coolant over the cross-sectional area of the body portion to provide a substantially uniform, stratified flow of the inlet coolant that flushes an existing coolant from the TES device at an outlet port to the laser system and mitigates mixing of the inlet coolant with the existing coolant.

14. The system of claim 13, further comprising:
- a bypass path configured in parallel with the stratified TES device; and
- a control valve that controls fractional portions of coolant that flow through the stratified TES device and the bypass path to provide a desired mixing ratio of the existing coolant and a bypass coolant to the laser system,
- wherein the bypass coolant and inlet coolant is a hot coolant that has a temperature $T_H$ and the existing coolant in the stratified TES device is a cold coolant having a temperature $T_C$, which is less than $T_H$, such that the control valve provides a coolant at a set temperature $T_{SET}$ to the laser system based on the fractional portions of the cold coolant from the stratified TES device and the hot coolant from the bypass path, the temperature $T_H$ being a result of heating of coolant at temperature $T_{SET}$ from at least one of the laser system and the pump.

15. The system of claim 13, further comprising an outlet perforated plate that extends over the cross-sectional area of the cylindrical body portion near the second header to flush the existing coolant from the TES device at the outlet port.

16. The system of claim 15, further comprising:
- a first baffle located in the first header horizontally, centered and spaced apart a predetermined distance from an opening in the inlet port to the first header to facilitate the distribution of flow of the inlet coolant to sweep out the existing coolant from the first header; and
- a second baffle located in the second header horizontally, centered and spaced apart a predetermined distance from an opening in the outlet port to the second header to facilitate the distribution of flow of outlet coolant to sweep out the existing coolant from the second header.

17. The system of claim 15, further comprising a first perforated cylinder that extends from an opening in the inlet port into the first header to facilitate the distribution of flow of the inlet coolant to sweep out the existing coolant from the first header.

18. The system of claim 17, further comprising a second perforated cylinder that extends from an opening in the outlet port into the second header to facilitate the distribution of flow of outlet coolant to sweep out the existing coolant from the second header.

19. A coolant system for delivering coolant to a laser system, the coolant system comprising:
- means for pumping coolant to the laser system;
- means for storing a cold coolant having a temperature $T_C$, the means for storing a cold coolant comprising means for distributing a hot coolant, having a temperature $T_H$ which is greater than $T_C$, received at an input port over a cross-sectional area of the means for storing to provide a substantially uniform, stratified flow of a hot coolant that flushes the cold coolant at an outlet port to the laser system and mitigates mixing of the hot coolant with the cold coolant; and
- means for controlling fractional portions of the cold coolant flushed from the means for storing and a hot coolant that flows through a bypass path to provide a desired mixing ratio of the hot coolant and the cold coolant that flows through the means for controlling and provide a coolant at a set temperature $T_{SET}$ to the laser system.

20. A system of claim 19, further comprising means for flushing out an end portion of the means for storing to facilitate the flushing out of the cold coolant from the end portion of the means for storing.

* * * * *